(12) United States Patent
Kruizinga et al.

(10) Patent No.: US 9,383,490 B2
(45) Date of Patent: Jul. 5, 2016

(54) DEPOLARIZER, TELESCOPE AND REMOTE SENSING DEVICE AND METHOD

(71) Applicant: Nederlandse Organisatie voor toegepast-natuurwetenschappelijk onderzoek TNO, Delft (NL)

(72) Inventors: Borgert Kruizinga, Delft (NL); Huibert Visser, Delft (NL); Michiel David Nijkerk, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 37 days.

(21) Appl. No.: 14/363,552

(22) PCT Filed: Dec. 10, 2012

(86) PCT No.: PCT/NL2012/050871
§ 371 (c)(1),
(2) Date: Jun. 6, 2014

(87) PCT Pub. No.: WO2013/085390
PCT Pub. Date: Jun. 13, 2013

(65) Prior Publication Data
US 2014/0320852 A1    Oct. 30, 2014

(30) Foreign Application Priority Data
Dec. 9, 2011 (EP) .................................... 11192883

(51) Int. Cl.
| | |
|---|---|
| *G02B 5/30* | (2006.01) |
| *G02B 27/28* | (2006.01) |
| *G01J 3/02* | (2006.01) |
| *G02B 27/00* | (2006.01) |
| *G01J 3/28* | (2006.01) |
| *G02B 23/00* | (2006.01) |

(52) U.S. Cl.
CPC ................. *G02B 5/30* (2013.01); *G01J 3/0224* (2013.01); *G01J 3/28* (2013.01); *G02B 5/3083* (2013.01); *G02B 23/00* (2013.01); *G02B 27/0018* (2013.01); *G02B 27/286* (2013.01); *G02B 2207/123* (2013.01)

(58) Field of Classification Search
CPC ...... G02B 5/30; G02B 23/00; G02B 27/0018; G02B 27/286; G02B 5/3083; G02B 2207/123; G01J 3/28; G01J 3/0224
See application file for complete search history.

(56) References Cited

U.S. PATENT DOCUMENTS

| | | | | |
|---|---|---|---|---|
| 4,198,123 A | * | 4/1980 | Kremen ............... | G02B 5/3083 356/317 |
| 7,042,610 B1 | * | 5/2006 | Berman ................ | G02B 5/00 359/226.1 |
| 2003/0007149 A1 | * | 1/2003 | Yamamoto ............. | G01J 3/02 356/328 |

(Continued)

OTHER PUBLICATIONS

International Search Report—PCT/NL2012/050871—Mailing date: Mar. 21, 2013.

*Primary Examiner* — Michael A Lyons
*Assistant Examiner* — Dominic J Bologna
(74) *Attorney, Agent, or Firm* — Banner & Witcoff, Ltd.

(57) ABSTRACT

A light beam is applied to a front surface of an optical depolarizer. The depolarizer rotates the polarization of light received on different surface positions by different amounts, so that the average incoming polarization is scrambled. The depolarizer has a first and second body that transmit first and second polarization components of the beam with mutually different speeds of light. Each body has two wedge shaped parts of variable thickness, corresponding wedge shaped parts in the two bodies providing light paths of substantially position independent lengths, but with variable rotation of polarization. The wedge shape parts of the front body form a concave input surface for the incoming beam. This prevents cross-over of light between the different wedge shaped parts.

16 Claims, 3 Drawing Sheets

(56) References Cited

U.S. PATENT DOCUMENTS

2006/0146384 A1* 7/2006 Schultz .................. G02B 27/09 359/9

2007/0014504 A1* 1/2007 Fiolka .................. G02B 27/286 385/11
2009/0296066 A1* 12/2009 Fiolka .................. G02B 27/286 355/71

* cited by examiner

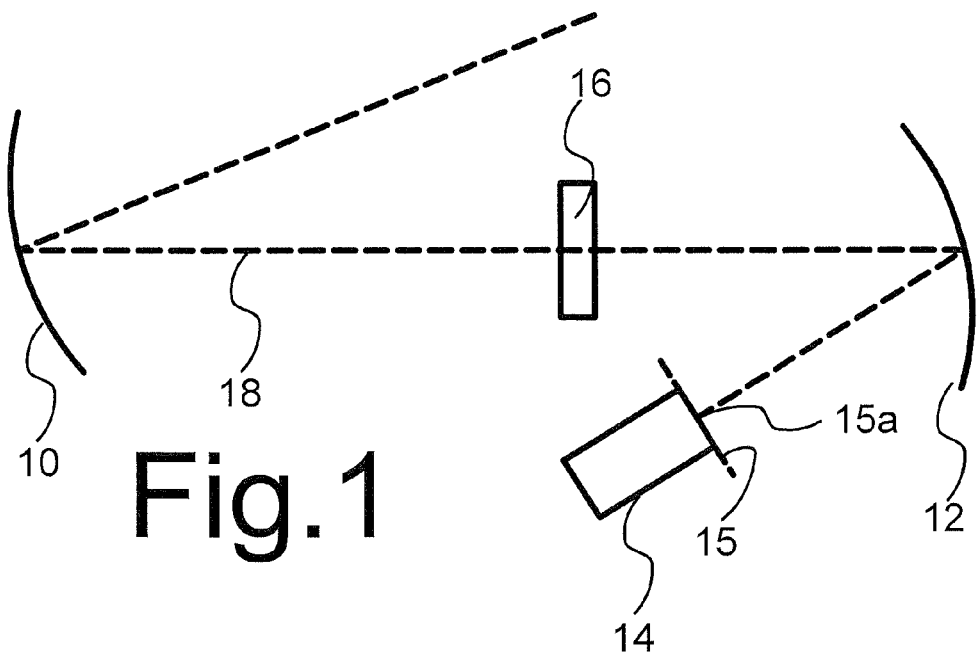
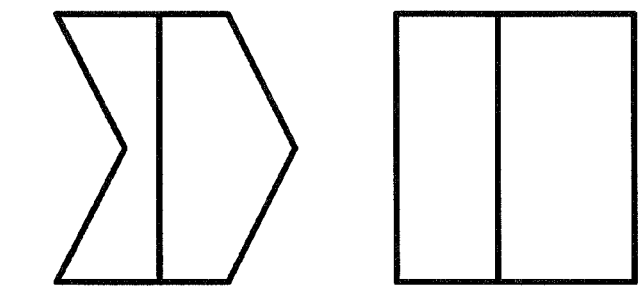
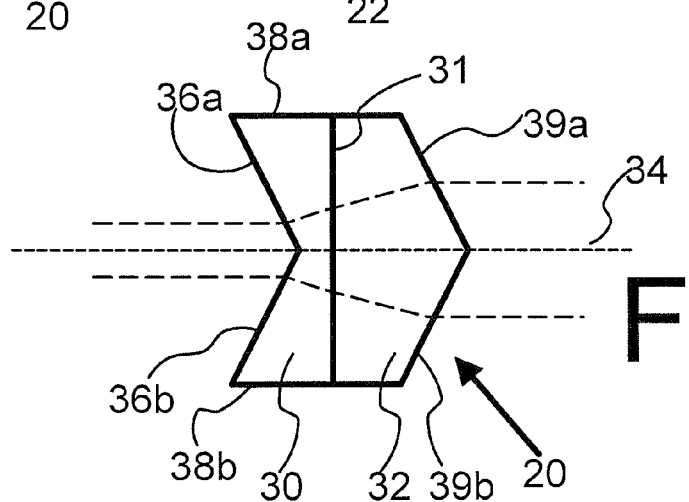

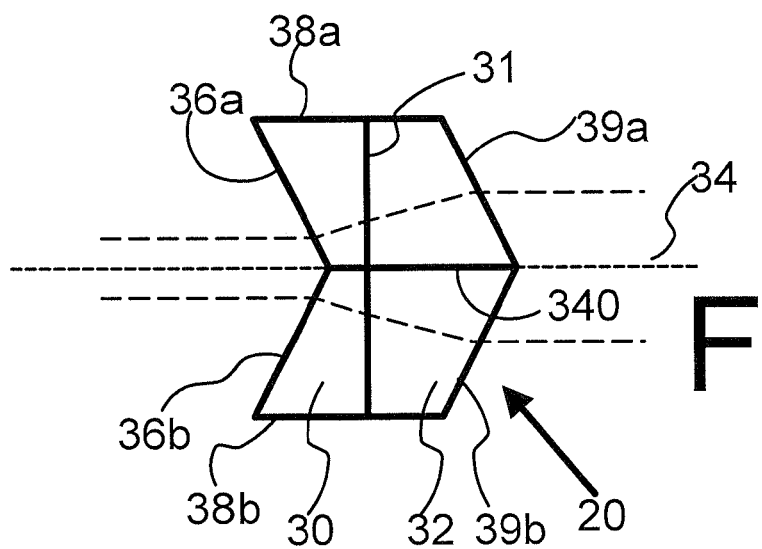

DEPOLARIZER, TELESCOPE AND REMOTE SENSING DEVICE AND METHOD

CROSS-REFERENCE TO RELATED APPLICATIONS

This application is a U.S. National Stage application under 35 U.S.C. §371 of International Application PCT/NL2012/050871 (published as WO 2013/085390 A1), filed Dec. 10, 2012, which claims priority to Application EP 11192883.4, filed Dec. 9, 2011. Benefit of the filing date of each of these prior applications is hereby claimed. Each of these prior applications is hereby incorporated by reference in its entirety.

FIELD OF THE INVENTION

The invention relates to a depolarizer, a telescope and a remote sensing device containing such a depolarizer, a depolarizing method and a remote sensing method.

BACKGROUND

A depolarizer, also called a polarization scrambler, is an optical device that reduces and preferably removes polarization of a beam of light that passes through the depolarizer. A depolarizer may be realized for example by means of a wedge shaped plate, that is, a plate that has a thickness in the beam direction that varies as a function of position in a plane transverse to the beam direction. The plate is made of a material that changes polarization by causing a relative phase shift between polarization components, by an amount that is proportional to the distance that the light travels through the plate, typically as a periodic function of the thickness. Because of the position dependent thickness the change of polarization varies as a function of position in said plane transverse to the beam, with the result that the spatial average of the polarization of the beam is reduced. The best depolarization result is achieved if the changes of the polarization at the thinnest and thickest part of the plate differ by many periods of the thickness dependence.

US2009/0296066 discloses depolarizers for use in a microlithographic projection exposure apparatus. A Hanle depolarizer is described, which contains a wedge plate of birefringent material arranged with the crystal optic axis of the birefringent material at an angle of 45 degrees with the polarization direction. As is known per se, a birefringent material has a different speed of light for light with polarization directed along a main crystal axis than for light with polarization directed transverse to that axis, thus causing the phase shift. A Hanle depolarizer is most effective when the incoming light has a substantial polarization component at an angle of 45 degrees with the crystal optic axis. It is ineffective for the polarization state directed at 0 or 90 degrees angle. To bring about a relative phase change for these components, a first and second wedge may be used, with the birefringent axes of the first and second wedge oriented at forty five degrees to each other.

US2009/0296066 also describes a depolarizer with wedge plates of optically active material wherein the optic axis is directed along the beam direction. Herein the speed of light for different helical polarizations around the optical axis differs. Furthermore, US2009/0296066 discloses an embodiment wherein these wedge shape plate is replaced by a plate with a sawtooth surface, which effectively provides a plurality of local wedge shapes, with back to back increases and decreases of the thickness. This structure makes it possible to provide a high thickness gradient, that is, a high polarization rotation gradient, without requiring a plate that is very thick at its thickest point.

The use of a wedge shape, i.e. a plate wherein the opposing surfaces are not parallel has the effect of deflecting the optical beam, which is undesirable. Therefore, the Hanle depolarizer usually contains a first and second wedge plate in series, the first and second wedge shaped plate conventionally being of the same material, with crystallographic axes rotated relative to each other. The resulting depolarizer is also called a Babinet depolarizer. In such a depolarizer, the input plane of the first wedge plate is parallel to the output plane of the second wedge plate and perpendicular to the beam direction. Internally in the depolarizer the output plane of the first wedge plate is parallel to the input plane of the second wedge plate, both at a non-perpendicular angle to the beam direction. Two such pairs of wedges may be used if wedges with birefringent axes oriented at forty five degrees to each other are used. This results in a Dual Babinet Compensator Pseudo-depolarizer (DBCP). Likewise, first and second wedge plates of optically active material may be used in series, with opposite polarization dependent differences. US2009/0296066 also describes a pairs of plate with complementary saw tooth surfaces, the teeth of the first plate being inserted between the teeth of the second plate.

In each of these embodiments, the depolarizer has parallel input and output surfaces, so that a single beam direction can be orthogonally incident on both surfaces. However, there is still an oblique interface within the pair of wedges with differently oriented material that has slightly different speeds of light for corresponding polarizations on different sides of the oblique interface, as is needed for the depolarizing effect. This means that a slight deflection of the beam is inevitable. What is worse is that this deflection differs for different polarization components. When used in a telescope the depolarizer therefore has the effect of splitting a spot image, or at least blurring the spot. For example, with four wedges, such as in a DBCP depolarizer, a spot may be split into $2^4=16$ parts. Yet worse, the intensity of the different spot parts depends on the intensity of the different polarization components at the input. Thus, the centre of mass of the spot (the weighted average of the positions in the spot, weighted by intensity) may shift when the intensity distribution of the polarization components at the input varies. Although this shift need not be detrimental to the resolution of the telescope, it can affect the reliability of measurements performed at specific points in the image plane.

U.S. Pat. No. 4,198,123 discloses a Babinet depolarizer comprising two wedge shaped elements joined at their oblique surfaces so that the front and back surface are parallel planes.

SUMMARY

Among others it is an object to provide for an improved depolarizer, with a more stable beam deflection.

Among others it is an object to provide for an improved telescope, with a more stable spot position.

Among others it is an object to provide for an improved remote sensing device, with which the properties of light from a distant source position can be more reliably measured.

According to one aspect an optical depolarizer according to claim 1 is provided. Herein the front surface of the depolarizer has first and second surface parts that form a concave angle in the front surface. As a result, the parts of the beam that are incident on the front surface on different legs of the angle break away from each other, preventing an unequal loss of light. This reduces spot position variation.

In an embodiment, the first and second surface part are inclined at a same angle towards a virtual plane along the beam direction that separates the parts. Thus a mirror symmetric structure is obtained, with reduced spot position variation. In a further embodiment the first and second body have parallel planar surfaces internally in the optical depolarizer. This simplifies manufacture. In a further embodiment the further surfaces are in optical contact with each other. The surfaces may be polished to a degree of smoothness at which the wedges will stick due to van der Waals forces without glue. This simplifies assembly.

In an embodiment, the thickness of the first and second body may vary mirror symmetrically on mutually opposite sides of the virtual plane. Thus, spot position variation can be minimized by equally distributing the beam over different sides of the virtual plane.

In an embodiment, an optical depolarizer system is provided that comprises a first and second optical depolarizer of the claimed type in series, to reduce polarization in different directions. In principle even more depolarizers may be placed in series. Each depolarizer multiplies the number of spots. By using the depolarizers of the claimed type, the intensity variation of the spots is reduced.

A telescope comprising the optical depolarizer or depolarizer system is provided. The telescope is improved because it has reduced spot position variation when there are polarization changes due to movement relative to imaged objects or changing objects. A remote sensing device with a detector that measures light properties, such as spectra, at selected positions in the image plane of the telescope is improved because corresponding object positions are less dependent on polarization content.

BRIEF DESCRIPTION OF THE DRAWING

FIG. 1 shows a remote sensing device with a depolarizer
FIG. 2 shows a depolarizer
FIG. 3, 3a show a part of a depolarizer

DETAILED DESCRIPTION OF EXEMPLARY EMBODIMENTS

Figure 4:
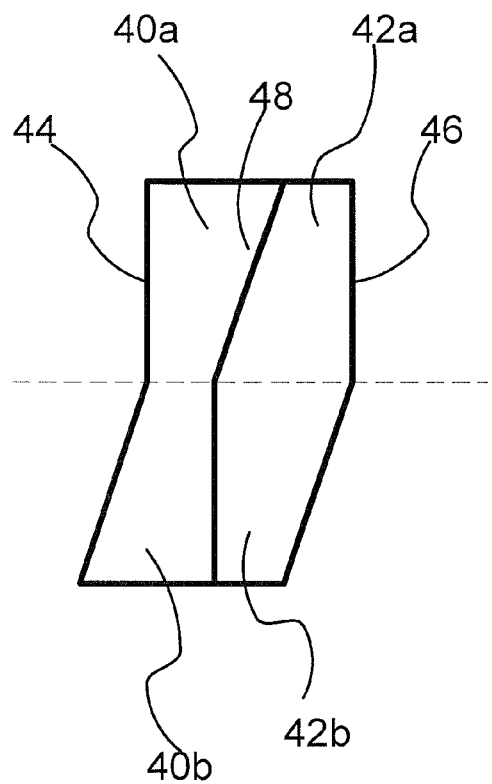
FIG. 4, 4a show a part of an alternative depolarizer

FIG. 1 shows a remote sensing device, including a telescope with a first reflector lens 10, a second reflector lens 12 and a depolarizer system 16. Furthermore, the remote sensing device comprises a measuring device 14. By way of illustration a ray path has been indicated by a dashed line 18, Depolarizer system 16 is located in a pupil plane of the telescope. Measuring device 14 has an aperture in an image plane 15 of the telescope. Thus, measuring device 14 measures light properties at selected locations in image plane 15, defined by the aperture. The aperture may be slit shaped for example, the slit 15a extending perpendicularly to the plane of the drawing. Measuring device 14 may comprise a spectroscope for example (not shown), configured to measure a plurality of spectral intensity distributions at different positions along the length of the slit. When the telescope is moved relative to an object in a direction that makes the image of the object in image plane move in a direction transverse to the slit properties of different positions of the object along the direction of motion can be measured. This is called the push broom telescope principle. The telescope may be mounted in a satellite for example, in which case the orbital movement of the satellite provides for the movement relative to the object. This has the effect that in the course of time measurements of the light received from different objects can be performed, which may have different polarization content.

In operation, first reflector lens 10 images light from an object (not shown) onto an intermediate image plane between first and second reflector lens 12. In practice more distributed intermediate images may be used. Second reflector lens 12 images the intermediate image onto the image plane 15. A pupil plane (an image of the aperture of the telescope) arises between the intermediate image plane and second reflector lens 12. Depolarizer system 16 is located in this pupil plane.

FIG. 2 shows the depolarizer system in more detail. The depolarizer system comprises a first depolarizer 20 and a second depolarizer 22. First and second depolarizer 20 may comprise birefringent material and both may have the same structure, the structure of the first depolarizer 20 being oriented at an angle to that of the second depolarizer 22.

FIG. 3 shows a cross-section of first depolarizer 20, further also called depolarizer 20. Depolarizer 20 comprises a first body 30 of birefringent material and a second body 32 of birefringent material. The birefringence axes of first body 30 are oriented a ninety degrees to the corresponding birefringence axes of second body 32. First body 30 is on the front side of depolarizer 20, i.e. the side facing the incoming light beam. Second body is on the back side of the depolarizer 20, i.e. the side of the outgoing light beam. In front of the front side (i.e. the front surface of the depolarizer) open space may be provided, e.g. a vacuum a gas atmosphere. Similarly open space may be provided behind the back side (i.e. the back surface of the depolarizer). Instead of the open space transparent solid material may be used. First and second body 30, 32 are mirror symmetric with respect to a symmetry plane that is indicated in cross-section by dashed line 34. The symmetry plane is a virtual plane of symmetry. It need not contain a physical mirror or any other structure.

First body 30 has an input surface that comprises a first plane 36a and a second plane 36b visible as lines in the cross-section. First plane 36a extends from a first edge 38a of depolarizer 20 to symmetry plane 34. Second plane 36b extends from a second edge 38b of depolarizer 20 to symmetry plane 34. First and second plane 36a,b are at equal but opposite angles to the symmetry plane, forming a concave angle in first body 30 on the front surface of depolarizer 20, i.e. near symmetry plane 34 the incoming light has to travel a greater distance to the front surface than near edges 38a,b.

The interface 31 between first body 30 and second body 32 is a planar and perpendicular to symmetry plane 34.

Second body 32 has an output surface that comprises a first plane 39a and a second plane 39b visible as lines in the cross-section. First plane 39a extends from first edge 38a of depolarizer 20 to symmetry plane 34. Second plane 39b extends from a second edge 38b of depolarizer 20 to symmetry plane 34. First and second plane 39a,b of second body 32 are at that same equal but opposite angles to the symmetry plane as first and second plane 36a,b of second body 30, but they form a convex angle in second body 32 on the back surface of depolarizer 20, i.e. near symmetry plane 34 the outgoing light has to travel a greater distance through second body 32 to the back surface than near edges 38a,b.

In operation, depolarizer 20 produces slightly different deflections of the propagation direction of light components with different polarization. The incoming beam comprises incoming light directed substantially parallel to symmetry plane 34. Because the first planes 36a, 39a of first and second body are parallel, and the same holds for the second planes 36b, 39b, light rays that enter at the first plane 36a at the front and exit at the first plane 39a at the back will be broken back to a direction substantially parallel to symmetry plane 34. The same goes for light rays that enters at the second plane 36b at the front and exit at the second plane 39b at the back.

But there are slight deviations because these light rays cross the internal interface 31 between the bodies at an oblique angle (not perpendicularly to the plane of interface 31). Due to the different orientation of the birefringent material in the bodies 30, 32, the speed of light in first body 30 for the same polarization component is slightly different in the bodies 30, 32, which will cause a deflection. The other polarization component is also deflected, but in the opposite direction. In both cases, this has the effect that the back surface does not break back the ray to its original direction at which it was incident on the front surface, even though the front and back surface are parallel where the ray passes through these surfaces.

As a result there is a deflection of the direction of propagation of the beam components. Moreover the beam components with different polarization will have slightly different deflection behind depolarizer 20. The first and second polarization components of light deflected by first surfaces 36a, 39a of first and second body 30, 32, are deflected mainly to a first and second direction respectively. The effect is different for light deflected by second surfaces 36b, 39b of first and second body 30, 32. In this case the first and second polarization components are deflected mainly to the second and first direction respectively. As a result, the intensity of light reflected in the first direction is the sum of the first and second polarization components incident on the first and second surface 36a,b respectively. The intensity of light reflected in the second direction is the sum of the second and first polarization components incident on the first and second surface 36a,b respectively. As long as the intensity of both polarization components is distributed equally over opposite sides of plane of symmetry 34, the intensity of light reflected in the first and second direction does not depend on the distribution of intensity over the polarization directions.

So far, the discussion has been limited to rays that travel between first surfaces 36a, 39a, or between second surfaces 36b, 39b, on either side of symmetry plane 24. An additional effect could arise if light crosses over through symmetry plane 34 within first and second body 30, 32. Light that crosses over may be lost for imaging, as it will be deflected more strongly. If there is a difference between the fractions of lost light from different sides of symmetry plane 34, this might reintroduce a dependence of intensity differences of light reflected in the first and second direction on the intensity distribution over the incoming polarization components.

In practice this could occur for incoming light components with a direction of propagation at angles to symmetry plane 34. In a telescope, the incoming beam will usually comprise a range of direction components, including not only a component with a direction of propagation along the optical axis of the telescope, parallel to symmetry plane 34 but also components with directions of propagation at angles to this symmetry plane 34.

The use of a concave angle at the input prevents that this reintroduces a dependence of deflection intensity difference on the incoming polarization distribution. The concave shape of the front surface of depolarizer 20 has the effect that light incident on first plane 36a of first body 30 is deflected at first plane 36a so that its angle with symmetry plane 34 is reduced. Within a range of angles in the incoming light direction the direction, the light is directed away from, or at most parallel to symmetry plane 34. The same holds for light incident on second plane 36b of first body 30. In other words, for light with direction components with this range of angles light paths do not cross symmetry plane 34 within first body 30. Nor do they cross symmetry plane 34 within second body 32. Thus, no asymmetric loss is introduced. In the telescope wherein only directions within this range are used (i.e. for image positions within a limited field of view if the depolarizer is located in a pupil plane), there is no dependence on the intensity distribution.

Preferably the depolarizer is located in the telescope so that the intensity of the parts beam on respective sides of the symmetry plane are substantially equal. The better equal the distribution, the less the centre of mass of the spot position will shift under influence of polarization changes, It should be noted that the shapes of bodies 30, 32 that are shown in FIG. 3 are only one example of shapes that could be used to achieve these effects.

FIG. 3a shows an embodiment wherein the depolarizer comprises a blackened layer 340, i.e. a layer that absorbs at least part of the light, and preferably a block layer 340, i.e. a layer that absorbs substantially all light in a predetermined wavelength range, at the location of symmetry plane 34. Black layer 340 may be created by assembling the depolarizer, or the first and second bodies 30, 32 from two parts that are joined at symmetry plane 34 and depositing a blackening material on the surface where the parts will be joined, before joining. Alternatively a plate or foil of black material may be included between the parts when they are joined.

In operation, the black layer 340 absorbs light that is incident on the black layer within the depolarizer. Black layer 340 absorbs stray light that enters depolarizer at an angle to the direction of the main beam. As the concave shape of the front surface of the depolarizer breaks the main beam away from the symmetry plane, black layer 340 does not absorb light from the main beam.

FIG. 4 shows examples of bodies with alternative shapes. In each example first body has a first and second wedge part 40a, b. Similarly second body has a first and second wedge parts 42a, b. Each wedge part has planar surfaces with orientations at a non-zero wedge angle to one another. The first wedge parts are combined in a first combination so that the front surface 44 and back surface 46 of the first combination are parallel and the internal interface 48 is at the wedge angle to the front and back surfaces. The second wedge parts are similarly combined in a second combination. At the same time the front surface of the first and second wedge parts 40a,b of first body are at an angle that provides a concave front surface.

The wedge angle provides for average depolarization. The parallel orientation of the front and back surfaces provides for substantially zero deflection. The use of two combinations of wedge parts provides for polarization independent intensity distribution of the intensity deflected in different directions. The concave angle prevents cross-over that could disturb the intensity distribution.

Figure 4A:
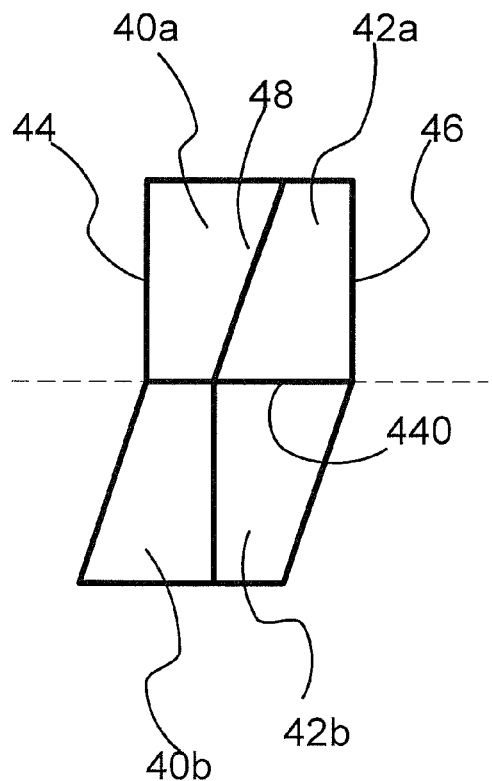

FIG. 4a shows an embodiment wherein the depolarizer comprises a black layer 440 similar to that of FIG. 3a between the lines on the front and back surface where that surface makes an angle. In operation, the black layer 440 absorbs stray light.

As noted, second depolarizer 22 of FIG. 2 may have the same structure as that of first depolarizer 20, except that the structures may be rotated relative to one another. In the embodiments with a black layer 340, 440, this means that the black layers of the first depolarizer 20 and the second depolarizer 22 will be at right angles to each other. In this way, the depolarizers can be used to absorb stray light from two direction ranges with little or no loss of the main beam.

As noted, second depolarizer 22 of FIG. 2 may have the same structure as that of first depolarizer 20, except that the structures may be rotated relative to one another. However, alternatively different structures may be used, rotated so that these structures depolarize different polarization components. Although embodiments have been described wherein first and second depolarizer 20, 22 are rotated geometrically relative to one another, it suffices that the first and second depolarizer 20, 22 have different orientations relative to the polarization directions of the beam. In an embodiment, first and second depolarizer 20, 22 may have the same geometrical orientation, when a polarization rotator (not shown), which rotates the remaining polarization of the beam over the desired angle, is included between first and second depolarizer 20, 22.

In different embodiments the main axes of the birefringent material may be oriented at different orientations to symmetry plane 34. In one embodiment, one of the main axes of the birefringent material (i.e. the direction of a linear polarization direction that is transmitted entirely at a single speed) is directed parallel to symmetry plane 34, perpendicular to the plain of view. In principle, any orientation of the axis of the material, in the plane perpendicular to the propagation direction of the light may be used. In an embodiment an orientation may be chosen that optimizes the depolarization including the difference in transmission of different polarization states when passing the entire instrument. This may be done for example by measuring remaining final polarization of the instrument for different directions and selecting the direction that yields least remaining polarization.

Although an embodiment using birefringent material has been described, it should be appreciated that alternatively the bodies may comprise optically active material that transmits different helical polarizations (clockwise, counter clockwise) at different speeds.

Although embodiments have been shown wherein the front surface consist of no more than two planar surface parts with a single angle between them, it should be appreciated that more surface parts may be used in the front surface, for example a first, second and third planar surface parts, with successive angles between the first and second surface parts and between the second and third planar surface parts. both of which make the front surface concave.

Although embodiments have been shown wherein the front surface is concave, it should be appreciated that alternatively a similar effect may be achieved with a convex surface, if a further body of transparent material and a higher index of refraction (lower speed of light) than the first body 30 is placed in front of first body 30. Such a further body may have a planar front surface normal to the incoming beam and a back surface matching the front surface of first body 30. In this case an optical depolarizer is provided for depolarizing a beam entering through a front surface of the optical depolarizer and leaving through a back surface of the optical depolarizer, wherein the optical depolarizer comprises a front body and a first and second body of transparent material, the front body adjoining first body and the second body adjoining the second body, the first and second body each having a thickness in direction of propagation of the beam that varies as a function of a position where the beam enters the front surface, a sum of the thicknesses of the first and second body being substantially independent of said position; the transparent material in the first and second body having speeds of light of first and second polarization components that are mutually different, the speed of light of the first polarization component in the first body equaling the speed of light of the second polarization component in the second body and vice versa; the front surface having a first and second surface part extending on first and second, mutually opposite sides from a virtual plane through the depolarizer respectively, the virtual plane being parallel to a main direction of beam propagation, the first and second surface part forming a convex angle in the front surface, the back surface having a third and fourth surface part parallel to the first and second surface parts, on the first and second side of the virtual plane respectively, the front body having a lower speed of light than the first body, so that the light breaks away from a juncture between the first and second surface part of the first body. In this case the first and second surface part form a concave angle in an effective optical sense, that is, an angle such that light rays on mutually opposite sides of the juncture between the surface parts of the front surface of the first body break away from each other.

In the illustrated embodiments the same material (e.g. $SiO_2$ or $MgF_2$) may be used in first and second body 30, 32, oriented along different directions. Alternatively, different materials may be used (e.g. $SiO_2$ and $MgF_2$) in first and second body 30, 32 respectively. This may have the advantage of providing for better compensation of the effect of temperature variation on the thickness of the bodies. In this case the corresponding parts of the front and back surface may be oriented at a non-zero angle relative to each other (not parallel) in order to provide for a same beam direction of the incoming and outgoing beam. More generally, although substantially parallel corresponding parts of the front and back surface may be used, i.e. angles between these parts than do not have the effect of increasing the spot size to more than double the theoretical spot size for perfectly parallel parts, alternatively a non-zero relative angle between corresponding parts of the front and back surface may be used to change the relative position of the spots due to the different components, for example reduce the increase in spot size due to the depolarizer.

Although embodiments have been shown wherein the bodies 30, 32 are in contact with each other at interface 31, it should be appreciated that they may be spaced apart. Direct optical contact facilitates assembly and it may improve optical quality. When bodies 30, 32 are spaced apart, an open space may be provided between the bodies or a transparent kit may be used between the bodies to connect the bodies.

The invention claimed is:

1. An optical depolarizer for depolarizing a beam having a direction of propagation along a first direction relative to the depolarizer, the beam entering through a front surface of the optical depolarizer and leaving through a back surface of the optical depolarizer, the optical depolarizer comprising:

a first and second body of transparent material, adjoining the front and back surface respectively, the first and second body each having a thickness in the first direction that varies as a function of a position for entry of the beam at the front surface, a sum of the thicknesses of the first and second body being substantially independent of said position;

the transparent material in the first and second body having speeds of light of first and second polarization components that are mutually different, the speed of light of the first polarization component in the first body equaling the speed of light of the second polarization component in the second body and vice versa;

the front surface having a first and second planar surface part extending on first and second, mutually opposite sides from a virtual plane through the depolarizer respectively, the virtual plane being parallel to the first direction, the first and second planar surface part forming a concave angle in the front surface, the back surface having a third and fourth surface part substantially parallel to the first and second surface parts, on the first and second side of the virtual plane respectively.

2. An optical depolarizer according to claim 1, wherein the first and second planar surface part are inclined at a same angle towards the virtual plane.

3. An optical depolarizer according to claim 2, wherein the first and second body have further surfaces internally in the optical depolarizer, the further surfaces being flat planar surfaces both perpendicular to said virtual plane.

4. An optical depolarizer according to claim 3, wherein the further surfaces are in contact with each other.

5. An optical depolarizer according to claim 1, wherein the thickness of the first second body varies mirror symmetrically on mutually opposite sides of the virtual plane.

6. An optical depolarizer according to claim 1, wherein the transparent material is a birefringent material.

7. An optical depolarizer according to claim 1, comprising a black layer or at least a blackened layer at said virtual plane.

8. An optical depolarizer according to claim 1, wherein the first and second planar surface part form said concave angle in the front surface along an intersection line of the first and second surface part with the virtual plane.

9. An optical depolarizer system, comprising a first and second optical depolarizer, both according to claim 1, in series along a beam path, wherein the virtual planes of the first and second optical depolarizer are oriented in parallel to different linear polarization directions of the beam.

10. A telescope comprising: an optical depolarizer for depolarizing a beam of the telescope, the beam having a direction of propagation along a first direction relative to the depolarizer, the optical depolarizer being located substantially in a pupil plane of the telescope, the beam entering through a front surface of the optical depolarizer and leaving through a back surface of the optical depolarizer, the optical depolarizer comprising:
a first and second body of transparent material, adjoining the front and back surface respectively, the first and second body each having a thickness in the first direction that varies as a function of a position for entry of the beam at the front surface, a sum of the thicknesses of the first and second body being substantially independent of said position;
the transparent material in the first and second body having speeds of light of first and second polarization components that are mutually different, the speed of light of the first polarization component in the first body equaling the speed of light of the second polarization component in the second body and vice versa;
the front surface having a first and second planar surface part extending on first and second, mutually opposite sides from a virtual plane through the depolarizer respectively, the virtual plane being parallel to the first direction, the first and second planar surface part forming a concave angle in the front surface,
the back surface having a third and fourth surface part substantially parallel to the first and second planar surface parts, on the first and second side of the virtual plane respectively.

11. A telescope according to claim 10, wherein the optical depolarizer or depolarizer system is positioned relative to an objective lens of the telescope so that the virtual plane divides the beam from the objective lens in parts with equal intensity.

12. A remote sensing device comprising the telescope of claim 10 and a detector having an aperture in an image plane of the telescope.

13. A method of depolarizing a light beam, using an optical depolarizer, the method comprising:
applying the light beam to a front surface of an optical depolarizer, distributed over mutually opposite sides of a virtual plane parallel to a main direction of beam propagation, the front surface having a first and second planar surface part extending on first and second, mutually opposite sides from the virtual plane, the first and second planar surface part forming a concave opening angle in the front surface;
providing a first body adjoining the front surface, the first body transmitting first and second polarization components of the beam with mutually different speeds of light, through a thickness of the first body that varies as a function of a position on the front surface where the beam enters;
providing a second body following the first body, the second body transmitting the first and second polarization components of the beam at the speed of light of the second and first polarization component in the first body respectively, through a thickness of the first body that varies as a function of said position, the second body adjoining a back surface of the optical depolarizer, a sum of the thicknesses of the first and second body being substantially independent of said position.

14. A remote sensing method, comprising collecting light from an object into a light beam, depolarizing the light beam using the method of claim 13, using the beam to form an image of the object onto an image plane, and sensing a property of light imaged onto a measuring position in the image plane.

15. A telescope comprising a first and second optical depolarizer for depolarizing a beam of the telescope, the beam having a direction of propagation along a first direction relative to the first and second depolarizer, the first and second optical depolarizer being located in series along a beam path substantially in a pupil plane of the telescope, the beam entering through a front surface of the first optical depolarizer and entering a front surface of the second optical depolarizer from a back surface of the first optical depolarizer, and leaving through a back surface of the second optical depolarizer, the first and second optical depolarizer each comprising:
a first and second body of transparent material, adjoining the front and back surface respectively, the first and second body each having a thickness in the first direction that varies as a function of a position for entry of the beam at the front surface, a sum of the thicknesses of the first and second body being substantially independent of said position;
the transparent material in the first and second body having speeds of light of first and second polarization components that are mutually different, the speed of light of the first polarization component in the first body equaling the speed of light of the second polarization component in the second body and vice versa;
the front surface having a first and second planar surface part extending on first and second, mutually opposite sides from a virtual plane through the depolarizer respectively, the virtual plane being parallel to the first direction, the first and second planar surface part forming a concave angle in the front surface,
the back surface having a third and fourth surface part substantially parallel to the first and second planar surface parts, on the first and second side of the virtual plane respectively, wherein the virtual planes of the first and second optical depolarizer are oriented in parallel to different linear polarization directions of the beam.

16. An optical depolarizer for depolarizing a beam having a direction of propagation along a first direction relative to the depolarizer, the beam entering through a front surface of the optical depolarizer and leaving through a back surface of the optical depolarizer, the optical depolarizer comprising:
- a first and second body of transparent material, adjoining the front and back surface respectively, the first and second body each having a thickness in the first direction that varies as a function of a position for entry of the beam at the front surface, a sum of optical thicknesses of the first and second body being substantially independent of said position;
- the transparent material in the first and second body being made of different materials, each material having speeds of light of first and second polarization components that are mutually different;
- the front surface having a first and second planar surface part extending on first and second, mutually opposite sides from a virtual plane through the depolarizer respectively, the virtual plane being parallel to the first direction, the first and second planar surface part forming a concave angle in the front surface,
- the back surface having a third and fourth surface part on the first and second side of the virtual plane respectively, the third and fourth surface part being oriented at a non-zero angle relative to the first and second surface part respectively.

* * * * *